United States Patent
Seynaeve et al.

(10) Patent No.: US 12,440,824 B2
(45) Date of Patent: Oct. 14, 2025

(54) METHOD OF AVOIDING SELF-COMBUSTION OF CARBONACEOUS ADSORBENT IMPREGNATED WITH A CATALYST

(71) Applicant: Desotec NV, Roeselare (BE)

(72) Inventors: Rikie Seynaeve, Roeselare (BE); Johan Craeye, Izegem (BE)

(73) Assignee: Desotec NV, Roeselare (BE)

( * ) Notice: Subject to any disclaimer, the term of this patent is extended or adjusted under 35 U.S.C. 154(b) by 517 days.

(21) Appl. No.: 17/969,281

(22) Filed: Oct. 19, 2022

(65) Prior Publication Data
US 2024/0131493 A1    Apr. 25, 2024
US 2024/0226850 A9    Jul. 11, 2024

(51) Int. Cl.
*B01J 20/32* (2006.01)
*B01J 20/20* (2006.01)
*B01J 20/34* (2006.01)

(52) U.S. Cl.
CPC ............ *B01J 20/3204* (2013.01); *B01J 20/20* (2013.01); *B01J 20/3416* (2013.01); *B01J 20/3483* (2013.01)

(58) Field of Classification Search
CPC .... B01J 20/3204; B01J 20/20; B01J 20/3416; B01J 20/3466; B01J 20/3483; C01B 32/36
See application file for complete search history.

(56) References Cited

U.S. PATENT DOCUMENTS

| | | | |
|---|---|---|---|
| 1,858,745 A | 5/1932 | Mackert | |
| 2,992,895 A | 7/1961 | Feustel et al. | |
| 4,008,174 A | 2/1977 | Jacobson et al. | |
| 4,587,112 A | 5/1986 | Kim | |

FOREIGN PATENT DOCUMENTS

| | | |
|---|---|---|
| EP | 0356658 A2 | 3/1990 |
| EP | 2628533 A1 | 8/2013 |
| EP | 3900823 A1 | 10/2021 |
| EP | 3900824 A1 | 10/2021 |
| EP | 3900825 A1 | 10/2021 |

OTHER PUBLICATIONS

Suzin et al., "Behavior of impregnated activated carbons heated to the point of oxidation" Carbon 36, Nov. 1998, 1557-1566 (Year: 1998).*

* cited by examiner

*Primary Examiner* — Anthony J Zimmer
*Assistant Examiner* — Abdul-Rahman Yusuf Waleed Smari
(74) *Attorney, Agent, or Firm* — Amster, Rothstein & Ebenstein LLP

(57) ABSTRACT

The present invention discloses a method for avoiding self combustion of carbonaceous adsorbent comprising a catalyst, the method comprising blowing air through the carbonaceous adsorbent thereby oxidizing catalyst and/or components that are in a reduced state and simultaneously cooling the carbonaceous adsorbent.

9 Claims, No Drawings

METHOD OF AVOIDING SELF-COMBUSTION OF CARBONACEOUS ADSORBENT IMPREGNATED WITH A CATALYST

FIELD OF THE INVENTION

The present invention relates to a method for avoiding self-combustion of carbonaceous adsorbent impregnated with a catalyst.

BACKGROUND

Carbonaceous adsorbents and particularly activated carbon are characterized by their high adsorption capacity for substances from gases and liquids and by their catalytic properties to convert and decompose these substances. They are particularly suitable for adsorbing and removing contaminants from gases and liquids and for decolorizing, deodorizing and purification of wastewater and waste gases.

When the amount of gases or liquids to be treated is relatively small, the carbonaceous adsorbent is typically used to full load (i.e. up to a small remaining adsorption capacity), and the spent or saturated carbonaceous adsorbent is then generally discarded. In large-scale industrial applications and in industrial wastewater treatment, however, it is important from an economical point of view that the large quantities of spent carbonaceous adsorbents are regenerated and re-used.

After all, carbon is a natural product obtained by the destructive distillation at high temperatures of, for example, coking coal, lignite coke or organic material such as peat and coconut shells. The fine carbon powder thus obtained is granulated for better handling and to improve filtration capacity and other physical properties of the carbon. In large-scale industrial applications, the carbonaceous adsorbent is an important cost factor. Methods for the manufacture of activated carbon are frequently described in literature and amongst others in the patent specification U.S. Pat. No. 4,107,084.

There are many known methods for regeneration, i.e. for removing adsorbed substances and reactivating spent carbonaceous adsorbents. Solvent extractions of spent carbonaceous adsorbents, under supercritical conditions or not, are described but the most common methods consist of the removal of excess water, pyrolysis of the dried carbonaceous adsorbent into volatile substances and carbon residues. Most of the methods for the regeneration of spent carbonaceous adsorbents are based on the well-known water/gas reaction in which carbon residues react at high temperatures with water to form carbon monoxide and hydrogen. A typical process for the regeneration of activated carbon is described in the patent specification No. U.S. Pat. No. 4,008,994.

The spent carbonaceous adsorbent is usually heated in the presence of a carrier gas and/or steam to a temperature of from 100° to 900° C. in order to remove adsorbed substances by pyrolysis. The methods for the thermal regeneration of spent carbon-based adsorbents according to the state of the art are, however, not particularly suitable for carbonaceous adsorbent that are impregnated with a catalyst such as for example potassium iodide, magnesium oxide, sodium hydroxide, potassium carbonate, potassium hydroxide, manganese oxide or calcium oxide. Catalyst impregnated carbonaceous adsorbents are used in particular for the cleaning of gas that contains significant amounts of contamination of sulfur compounds such as for example from sulfur-containing sewage gases such as biogas (from anaerobic fermentation), landfill gas and synthetic gas (so-called syn-gas). The catalyst of the carbonaceous adsorbent is typically present to convert $H_2S$ into elemental Sulphur. In this way, a high level of loading of the carbonaceous adsorbent is obtained and thus a longer lifetime of the active carbon filter is achieved.

SUMMARY OF INVENTION

Unfortunately, it has been observed that catalyst containing carbonaceous adsorbent is prone to the development of hotspots which may lead to self-combustion of the carbonaceous adsorbent, in particular when the carbonaceous adsorbent is spent and thus also contains contaminants adsorbed thereon. Some of these contaminants are volatile organic compounds which can act as fuel when hotspots develop in the carbonaceous adsorbent and/or cause the self-combustion temperature of the carbonaceous adsorbent to lower. It has been found that this risk of hotspot building and self-combustion may be caused by some part of the catalyst being in a reduced state. When such reduced catalyst, comes into contact with air, this can lead to an uncontrolled oxidation with the building of heat and hotspots in the carbonaceous adsorbent. Additionally some of the contaminants may be oxidized in an uncontrolled way and similarly lead to hotspots. For example where $H_2S$ is being adsorbed on a catalyst containing carbonaceous adsorbent, the conversion of $H_2S$ to elemental sulphur may not be complete. This is particularly so where the carbonaceous adsorbent has been used under low oxygen atmosphere conditions when adsorbing $H_2S$ from for example a gas stream. The remaining sulphide may cause hotspots when the carbonaceous adsorbent comes into contact with air and uncontrolled oxidation of the incompletely oxidized sulphide takes place. The problem of hotspot development and spontaneous combustion of the carbonaceous adsorbent presents a serious safety problem when it is desired to regenerate the catalyst containing carbonaceous adsorbent.

Furthermore, it has been found that the atmosphere that exists in the furnace used in the thermal regeneration method of carbonaceous adsorbent, is low in oxygen and is a generally reducing atmosphere such that some of the catalyst of the carbonaceous adsorbent may be reduced therein as well. When such reduced catalyst is again exposed to air, the catalyst may oxidize in an uncontrolled way leading to release of heat and the formation of hotspots in the carbonaceous adsorbent which may result in self-combustion of the adsorbent.

Hence, catalyst impregnated carbonaceous adsorbent is typically discarded and burnt whereby valuable amounts carbonaceous adsorbent are wasted. It is thus desirable to find a method whereby hotspot building and self-combustion of a catalyst impregnated carbonaceous can be avoided. It is furthermore desirable to find a method that also allows regenerating catalyst containing carbonaceous adsorbent In accordance with the present invention there is provided a method for avoiding self combustion of carbonaceous adsorbent comprising a catalyst, the method comprising blowing air through said carbonaceous adsorbent thereby oxidizing catalyst and/or components that are in a reduced state and simultaneously cooling the carbonaceous adsorbent.

It was found in connection with the present invention that blowing air through the carbonaceous adsorbent allows for a controlled oxidizing of catalyst that is in a reduced state as well as components that are in a reduced state. Blowing air through the carbonaceous adsorbent simultaneously cools the carbonaceous adsorbent thus achieving a controlled oxidation of catalyst and/or components on the carbonaceous adsorbent that are in a reduced state. As a result, the process substantially avoids the build-up of any hotspots and self combustion of the carbonaceous adsorbent can be avoided. Typically, the linear velocity of the air blowing through the carbonaceous adsorbent should be high enough to cause oxidation of the catalyst as well as sufficient simultaneous cooling of the carbonaceous adsorbent, thus allowing for controlled oxidation without hotspots being generated. A suitable linear velocity will conveniently be at least 0.01 m/s, for example at least 0.10 m/s, preferably between 0.10 and 1.50 m/s, more preferably between 0.10 and 0.60 m/s. The linear velocity may be adjusted through the flow rate of for example a ventilator used for blowing the air through the carbonaceous adsorbent. The linear velocity may conveniently be measured through an anemometer.

The likelihood of hotspot building and self-combustion may exist when spent carbonaceous adsorbent arrives at a plant for regenerating carbonaceous adsorbent and/or immediately after the carbonaceous adsorbent has been regenerated in a furnace. Accordingly, depending on the circumstances, the present method may be used for spent carbonaceous adsorbent prior to being regenerated and/or with carbonaceous adsorbent that has been regenerated in a thermal regeneration process.

Also in a particular embodiment, the carbonaceous adsorbent may be immersed and/or impregnated with water subsequent to the controlled oxidation of the catalyst and/or components that are in a reduced state by blowing air through the carbonaceous adsorbent.

DETAILED DESCRIPTION

Before the present method, the present use and the present system of the invention are described, it is clarified that the present invention is not limited to specific systems and methods or combinations that are described, since said methods, installations and combinations may of course vary. The terminology that is used herein is not intended as being limiting, since the scope of the present invention is limited exclusively by the appended claims.

As used herein, the singular forms "the" and "a" encompass both the singular and plural references, unless the context clearly indicates otherwise.

The terms "comprising", "comprises" and "consisting of" are, as used herein, synonymous with "inclusive", "including" or "containing", "contains" and are inclusive or open-ended and do not exclude any additional, unstated members, components or steps. The terms "comprising", "comprises" and "consisting of" as used herein are intended to encompass the terms "consisting of" and "consists of".

The statement of numerical ranges with end points comprises all numbers and fractions that fall within said range, as well as the stated end points.

The term "about" or "approximately", as used herein when referring to a measurable value such as a parameter, an amount, a duration and the like, is meant to comprise variations of +/−10% or less, preferably +/−5% or less, more preferably +1-1% or less and even more preferably +/−0.1% or less than the 10 specified value, in so far as such variations are suitable for being made in the invention described.

Although the terms "one or more" or "at least one", such as one or more members or at least one member of a group of members, are clear per se, by way of further explanation the terms comprise among other things a reference to one of said members or to any arbitrary two or more of said members, such as any arbitrary ≥3, ≥4, ≥5, ≥6 or ≥7, etc. of said members, and up to all said members.

All references that are cited in the present description are incorporated hereby by reference in their entirety. In particular, the teaching of all references specifically referred to herein is incorporated by reference.

Unless otherwise defined, all terms that are used when describing the technology, including technical and scientific terms, have the same meaning as is understood by someone with an average knowledge of the field to which this technology belongs. By way of further guidance, the definitions of some terms are included for better understanding of the teaching of the present technology.

Various aspects of the invention are defined in more detail in the following passages. Each aspect that is defined as such may be combined with any other aspect or any other aspects, unless the contrary is clearly stated. In particular, any feature that is indicated as being preferred or advantageous may be combined with any other feature or any other features that are stated to be preferred or advantageous.

Throughout this description, reference to "an embodiment" or "one embodiment" signifies that a specific feature, specific structure or property that is described in connection with the embodiment is incorporated in at least one embodiment of the present invention. Thus, appearances of the phrases "in an embodiment" or "in one embodiment" at different places in this description do not necessarily all refer to the same embodiment, but they might well. Moreover, the specific features, structures or properties may be combined in any suitable way in one or more embodiments, as would be clear to an expert in the field of study from this description. Although particular embodiments that are described herein comprise some features that are not included in other embodiments, but others are not, combinations of features of different embodiments are moreover intended to fall within the scope of the invention, and to form individual embodiments, as would be clear to experts in the field of study. For example, in the appended claims, each of the claimed embodiments may be used in any combination.

The following detailed description should consequently not be construed as being limiting, and the scope of the present invention is defined by the appended claims.

As used herein, the term "carbonaceous adsorbent" refers to a carbon-containing material consisting partially or largely of carbon and that is capable of adsorbing substances in particular contaminants from a gas or liquid. In particular, a carbonaceous material is meant that has undergone a thermal and/or chemical activating process and as a result contains a large number of pores, which dramatically increases the contact surface area of this material relative to unactivated material. This material is characterized by a high adsorption capacity of one or more substances. Accordingly carbonaceous adsorbent is also known and may be referred to herein as "activated carbon", "active carbon", "activated charcoal", "active charcoal" or "Norit". The carbonaceous adsorbent may be in any form as known or used in the art including powder form, granular form, extruded form, bead form, or woven form. Generally, the carbonaceous adsorbent will be in granular form, extruded form or bead form.

The carbonaceous adsorbent is impregnated with a catalyst. In a particular embodiment, the catalyst is an inorganic salt, hydroxide or oxide that comprises a metal ion selected from the group consisting of K+, Na+, Cu++, Mn++, Mg++, Ca++ and Fe+++. In a particular embodiment, the catalyst is selected from NaOH, Fe(OH)$_3$, K$_2$CO$_3$, KI, I$_2$, KOH, CaO, Ca(OH)$_2$, MgO, CuO and MnO. The amounts of impregnated catalyst may vary widely and are typically between 0.5 and 35% by weight, for example between 1 and 25% by weight or between 3 and 15% by weight. Typically, the amount of catalyst will be chosen based on the application and type of catalyst. Exemplary embodiments of catalyst impregnated carbonaceous adsorbent include carbonaceous adsorbent impregnated with 1.0 to 30.0% by weight NaOH, 1.0 to 20.0% by weight of $Fe(OH)_3$, 1.0 to 30.0% by weight of $K_2CO_3$, 1.0 to 10.0% by weight KI, 1.0 to 10.0% by weight $I_2$, 1.0 to 20.0% by weight of KOH, 1.0 to 10.0% by weight of CaO, 1.0 to 10.0% by weight of $Ca(OH)_2$, 1.0 to 10.0% by weight of MgO, 1.0 to 10.0% by weight of CuO or 1.0 to 10.0% weight of MnO. Herein the % by weight is expressed relative to the weight of the carbonaceous adsorbent without the impregnated catalyst.

The catalyst impregnated carbonaceous adsorbent is typically used to remove contaminants from a liquid or gas, in particular a gas such as biogas, landfill gas and syn-gas by contacting the gas with the carbonaceous adsorbent for example by guiding the gas through a bed of the carbonaceous adsorbent. The contaminants are thereby adsorbed on the carbonaceous adsorbent. In a particular embodiment, the gas to be cleaned may be brought into contact with the carbonaceous adsorbent once or several times, wherein the carbonaceous adsorbent in loose form is brought into contact with the gas, or in a form wherein the carbonaceous adsorbent is surrounded by gas-permeable packaging or a gas-permeable membrane. Contact between the gas and the carbonaceous adsorbent membrane is characterized by incubation without movement of air, or by contact wherein the gas is led passively or actively at a constant or variable flow rate through a space that contains the carbonaceous adsorbent. When the maximum loading capacity of the carbonaceous adsorbent is reached, i.e. no further contaminants can be efficiently adsorbed and the carbonaceous adsorbent is saturated, the carbonaceous adsorbent is spent and needs to be regenerated whereby the process according to the invention can be used. Contaminants that may be adsorbed by the carbonaceous adsorbent from the gas include for example mercaptans, sulfides, sulfur, silanes, siloxanes, ammonia and other nitrogen containing organics, halogenated compounds, volatile organic compounds (terpentenes, ketones, alkanes, alkenes, cycloalkanes and aromatic compounds, volatile fatty acids, esters, ethers and alcohols). In particular where the gas is a methane-containing gas such as biogas, landfill gas or syn-gas, the spent carbonaceous adsorbent may contain significant amounts of Sulphur contaminants. Herein Sulphur contaminants refers to any sulfur-containing compound, not being limited to $H_2S$ (hydrogen sulfide) or $SO_2$ (sulfur dioxide). Accordingly, Sulphur contaminants include compounds of the group of sulfides, thiols, disulfides, polysulfides, thioesters, sulfoxides, sulfones, thiosulfinates, sulfimides, sulfoximides, sulfonediimines, S-nitrosothiols, sulfur halides, thioketones, thioaldehydes, thiocarboxylates, thioamides, sulfuric acids, sulfonic acids or sulfuranes.

In a particular embodiment, the loading of the spent carbonaceous adsorbent with Sulphur contaminants may be at least 5.0% by weight, for example at least 15.0% by weight or even at least 20.0% by weight. In a particular embodiment, the loading is between 20.0 and 60.0% by weight. Herein the weight % is expressed as the total weight percentage of sulphur containing contaminants to the dry spent carbonaceous adsorbent. By dry spent carbonaceous adsorbent is meant a spent carbonaceous adsorbent that has been dried for at least 4 hours at a temperature of 110° C.

In accordance with one particular embodiment, the method for avoiding self-combustion may be used in connection with a method for regenerating the carbonaceous adsorbent by a thermal regeneration process. Typically, in a thermal regeneration process, a spent carbonaceous adsorbent, i.e. the carbonaceous adsorbent comprising a catalyst and adsorbed contaminants, may be subjected to a pyrolyzing step and a reactivation step. In the pyrolyzing step at least part of the contaminants are pyrolyzed causing the contaminants to be decomposed and/or desorbed from the carbonaceous adsorbent. Further, the carbonaceous adsorbent may be simultaneously or subsequently subjected to steam so as to reactivate the carbonaceous adsorbent. The steps of pyrolyzing and reactivation are typically carried out in a furnace. The furnace for the regeneration of the spent carbonaceous adsorbents can be a fluidized bed, a rotary kiln, a multiple stage furnace, or a shaft furnace such as those frequently described in the state of the art for example as disclosed in U.S. Pat. Nos. 4,347,156 and 5,913,677. Most furnaces include a drying and a regeneration zone in which the spent carbonaceous adsorbent is dried and regenerated by means of pyrolysis with release of pyrolysis gases and volatile substances. Spent carbonaceous adsorbent is typically fed at a constant flow rate to the furnace and dried at a temperature of from 40° C. to 300° C. (preferably at a temperature of from 90° C. to 130° C.) and propelled mechanically and by means of discharged steam through the furnace where the carbonaceous adsorbent is regenerated and pyrolysis gases and other volatile substances are released under pyrolysis conditions, at temperatures of from 300° C. to 900° C. (preferably at temperatures of 350° C. to 700° C.) and preferably with addition of steam causing carbon residues to decompose into CO and $H_2$.

The method of avoiding self-combustion according to the present invention may be used prior to commencing the thermal regeneration process described above. Thus, in a particular embodiment in connection with the present invention, air is blown through the carbonaceous adsorbent comprising a catalyst and adsorbed contaminants thereby oxidizing catalyst and/or components that are in a reduced state and simultaneously cooling the carbonaceous adsorbent. The linear velocity of air blowing through the carbonaceous adsorbent should be set high enough to achieve the desired controlled oxidation as discussed above. Preferably, subsequent to this treatment the carbonaceous adsorbent comprising a catalyst and adsorbed contaminants may be immersed in and/or impregnated with water which may further cool the carbonaceous adsorbent and minimize hotspot building. Accordingly, self-combustion and hotspot building prior to the furnace may thereby be avoided allowing for safe storage prior to regeneration of the carbonaceous adsorbent.

Upon leaving the furnace, the reactivated carbonaceous adsorbent should conveniently be cooled to a temperature less than 250° C., for example less than 100° C., typically less than 40° C., preferably below 25° C. and more preferably below 20° C. and most preferably below 15° C. When leaving the furnace, the carbonaceous adsorbent will typically have a temperature of between 500° C. and 1000° C., generally between 600° C. and 900° C. To avoid any hotspots to form or build, cooling of the carbonaceous adsorbent is preferably carried out quickly to the target temperature. Cooling may be effected by quenching or through the use of a heat exchanger. In the case of cooling through quenching, the cooling medium may be selected from water, steam, air or an inert gas such as for example nitrogen or carbon dioxide and any of the known quenching devices may be used such as for example a fluid bed, a cooling tower, a walking floor, a water bath or a shaking belt through which the cooling medium is blown. In a preferred embodiment, a heat exchanger is used to cool the carbonaceous adsorbent whereby the carbonaceous adsorbent and the cooling medium are separated from each other. The media that may be used in the heat exchanger include air or water including ice water. The heat exchanger may include one, two or more screws that whirl the carbonaceous adsorbent and advance it. Alternatively the heat exchanger may include a rotating spiral or may be a rotary drum.

Additionally, the regenerated carbonaceous adsorbent may be subjected to air to cause controlled oxidation of catalyst that is in a reduced state in accordance with the method of avoiding self-combustion of the invention. Generally, as a result of the oxygen poor atmosphere in at least parts of the furnace, some amount of catalyst may have been reduced and uncontrolled oxidation thereof has been found to be a cause of hotspots and spontaneous combustion of the carbonaceous adsorbent. Controlled oxidation of catalyst in a reduced state may be effected by blowing air through the carbonaceous adsorbent in one or more ventilation stages through which the carbonaceous adsorbent may be guided. In a particular embodiment, the ventilation stages may comprise one or more silos to which is connected a ventilator to blow air in the silo and cause the carbonaceous adsorbent therein to be blown with air. Accordingly, in accordance with a particular embodiment of this invention, the method of avoiding self-combustion may also be used immediately following the regeneration of the carbonaceous adsorbent. Thus, subsequently to the regeneration of the carbonaceous adsorbent, air may be blown through the carbonaceous adsorbent typically at a high enough linear velocity of the air to control the oxidation while simultaneously cooling the carbonaceous adsorbent. A suitable linear velocity will conveniently be at least 0.01 m/s, for example at least 0.10 m/s, preferably between 0.10 and 1.50 m/s, more preferably between 0.10 and 0.60 m/s.

Further, in accordance with a particular embodiment, the carbonaceous adsorbent may be sieved to obtain carbonaceous adsorbent with the desired particle size and distribution. This sieving step, when implemented, may precede the step of blowing air through the regenerated carbonaceous adsorbent or may be subsequent thereto.

In accordance with a particular embodiment, the regenerated carbonaceous adsorbent may be immersed in and/or impregnated with water subsequent to the controlled oxidation step of the method of avoiding self-combustion of the invention. Additionally or alternatively, the regenerated carbonaceous adsorbent may be impregnated with an inert gas such $CO_2$ or nitrogen. This will have the advantage that any hotspot building during storage and in particular during startup in a process of removing contaminants from a liquid or gas can be minimized. In particular, it has been found that the impregnation with water or an inert gas slows down the initial take up contaminants such that a more even take up of the contaminants by the carbonaceous adsorbent results which aids in avoiding local buildup of heat in the carbonaceous adsorbent which may in some case also cause self-combustion.

In addition to the stream of regenerated carbonaceous adsorbent, the regeneration of carbonaceous adsorbent also creates a stream of pyrolysis gas. The pyrolysis gases are typically burned off in an incinerator whereby flue gases are obtained that should be treated so as to remove any harmful components therefrom prior to releasing the flue gases in the atmosphere. Any known and suitable method of cleaning flue gas may be used to clean the flue gas.

The invention claimed is:

1. A method for avoiding self combustion of a carbonaceous adsorbent comprising a catalyst, the method comprising
providing a carbonaceous adsorbent comprising one or more contaminants adsorbed on the carbonaceous adsorbent and where one or more of the contaminants are in a reduced state;
regenerating the carbonaceous adsorbent in a thermal regeneration process; and
blowing air through said carbonaceous adsorbent prior to and subsequent to regeneration of the carbonaceous adsorbent thereby oxidizing the catalyst and/or components that are in a reduced state and simultaneously cooling the carbonaceous adsorbent.

2. The method according to claim 1, wherein the air is blown through the carbonaceous adsorbent at a linear velocity of at least 0.01 m/s.

3. The method according to claim 1, wherein the carbonaceous adsorbent is subsequently immersed in and/or impregnated with water.

4. The method according to claim 1, wherein the carbonaceous adsorbent is subsequently impregnated with water and/or inert gas.

5. The method according to claim 1, wherein the catalyst is an inorganic salt, hydroxide or oxide that comprises a metal ion selected from the group consisting of $K+$, $Na+$, $Cu++$, $Mn++$, $Mg++$, $Ca++$ and $Fe+++$.

6. The method according to claim 1, wherein the carbonaceous adsorbent is impregnated with 1.0 to 30.0% by weight NaOH, 1.0 to 20.0% by weight of $Fe(OH)_3$, 1.0 to 30.0% by weight of $K_2CO_3$, 1.0 to 10.0% by weight KI, 1.0 to 10.0% by weight $I_2$, 1.0 to 20.0% by weight of KOH, 1.0 to 10.0% by weight of CaO, 1.0 to 10.0% by weight of $Ca(OH)_2$, 1.0 to 10.0% by weight of MgO, 1.0 to 10.0% by weight of CuO or 1.0 to 10.0% weight of MnO.

7. The method according to claim 1, wherein the air is blown through the carbonaceous adsorbent at a linear velocity of at least 0.10 m/s.

8. The method according to claim 1, wherein the air is blown through the carbonaceous adsorbent at a linear velocity between 0.10 and 1.50 m/s.

9. The method according to claim 1, wherein the air is blown through the carbonaceous adsorbent at a linear velocity between 0.10 and 0.60 m/s.

* * * * *